United States Patent
Wang et al.

(10) Patent No.: US 12,513,549 B2
(45) Date of Patent: Dec. 30, 2025

(54) MEASUREMENT CONFIGURATION METHOD AND APPARATUS

(71) Applicant: Huawei Technologies Co., Ltd., Shenzhen (CN)

(72) Inventors: Zhou Wang, Shenzhen (CN); Jian Wang, Beijing (CN); Haibo Xu, Beijing (CN); Yun Liu, Shenzhen (CN); Jian Zhang, Shenzhen (CN); Yiru Kuang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 432 days.

(21) Appl. No.: 17/919,876

(22) PCT Filed: Apr. 20, 2021

(86) PCT No.: PCT/CN2021/088367
§ 371 (c)(1),
(2) Date: Oct. 19, 2022

(87) PCT Pub. No.: WO2021/213377
PCT Pub. Date: Oct. 28, 2021

(65) Prior Publication Data
US 2023/0171631 A1    Jun. 1, 2023

(30) Foreign Application Priority Data
Apr. 20, 2020    (CN) .................... 202010311229.2

(51) Int. Cl.
*H04W 24/00*    (2009.01)
*H04W 24/10*    (2009.01)
(Continued)

(52) U.S. Cl.
CPC ....... *H04W 24/10* (2013.01); *H04W 36/0083* (2013.01); *H04W 76/20* (2018.02); *H04W 36/00692* (2023.05)

(58) Field of Classification Search
CPC ..... H04L 5/001; H04L 5/0057; H04L 5/0098; H04W 24/08; H04W 24/10;
(Continued)

(56) References Cited

U.S. PATENT DOCUMENTS 9,801,130 B2 * 10/2017 Dalsgaard ............. H04W 24/10
9,960,869 B2 *  5/2018 Takahashi ................ H04J 1/08
(Continued)

FOREIGN PATENT DOCUMENTS

CN    102237936 A    11/2011
CN    105813125 A    7/2016
(Continued)

OTHER PUBLICATIONS

3GPP TS 38.133 V16.3.0, Mar. 2020, "3rd Generation Partnership Project; Technical Specification Group Radio Access Network; NR; Requirements for support of radio resource management (Release 16)," 31 pages.
(Continued)

*Primary Examiner* — Frank Duong
(74) *Attorney, Agent, or Firm* — Conley Rose, P.C.

(57) ABSTRACT

A measurement configuration method includes A network device that sends first information to a terminal device. The first information includes configuration information of a secondary component carrier (SCC). The network device sends second information to the terminal device. The second information includes configuration information of a first measurement window and enables the terminal device to switch, when supporting carrier aggregation CA, from performing cell measurement in a measurement window-free
(Continued)

measurement manner to performing cell measurement using the first measurement window. A carrier included in the CA includes the SCC configured based on the first information.

20 Claims, 6 Drawing Sheets

(51) Int. Cl.
*H04W 36/00* (2009.01)
*H04W 76/20* (2018.01)
(58) Field of Classification Search
CPC ....... H04W 36/00692; H04W 36/0083; H04W 36/0088; H04W 76/20; H04W 76/27; Y02D 30/70
See application file for complete search history.

(56) References Cited

U.S. PATENT DOCUMENTS

| | | | |
|---|---|---|---|
| 10,455,635 B2* | 10/2019 | Park | H04L 5/001 |
| 10,924,958 B2* | 2/2021 | Yiu | H04W 36/0088 |
| 2013/0053082 A1 | 2/2013 | Chai et al. | |
| 2013/0100841 A1* | 4/2013 | Liang | H04L 5/001 |
| | | | 370/252 |
| 2015/0223087 A1 | 8/2015 | Yu et al. | |
| 2015/0327054 A1 | 11/2015 | Callender et al. | |
| 2016/0269919 A1 | 9/2016 | Kazmi et al. | |

FOREIGN PATENT DOCUMENTS

| | | |
|---|---|---|
| CN | 105814936 A | 7/2016 |
| CN | 106535215 A | 3/2017 |
| CN | 107493588 A | 12/2017 |
| CN | 110719597 A | 1/2020 |
| CN | 110971474 A | 4/2020 |
| WO | 2014047914 A1 | 4/2014 |
| WO | 2014188330 A1 | 11/2014 |

OTHER PUBLICATIONS

3GPP TS 38.331 V16.0.0, Mar. 2020, "3rd Generation Partnership Project; Technical Specification Group Radio Access Network; NR; Radio Resource Control (RRC) protocol specification (Release 16)," 835 pages.

3GPP TS 38.321 V16.0.0, Mar. 2020, "3rd Generation Partnership Project; Technical Specification Group Radio Access Network; NR; Medium Access Control (MAC) protocol specification (Release 16)," 141 pages.

* cited by examiner

MEASUREMENT CONFIGURATION METHOD AND APPARATUS

CROSS-REFERENCE TO RELATED APPLICATIONS

This is a U.S. National Stage of International Patent Application No. PCT/CN2021/088367 filed on Apr. 20, 2021, which claims priority to Chinese Patent Application No. 202010311229.2 filed on Apr. 20, 2020. Both of the aforementioned applications are hereby incorporated by reference in their entireties.

TECHNICAL FIELD

This application relates to the field of communications technologies, and in particular, to a measurement configuration method and an apparatus.

BACKGROUND

To ensure service continuity, when a terminal device moves to a cell edge, a network device delivers measurement control tasks such as inter-RAT measurement and inter-frequency measurement. Based on a capability of the terminal device, the measurement control tasks delivered by the network device are classified into two types: measurement window (Gap) measurement and measurement window-free (No Gap) measurement. If the terminal device has a plurality of radio frequency channels, and can support receiving a signal on an inter-frequency or inter-RAT neighboring cell when receiving and sending a signal in a serving cell, the terminal device supports measurement of a signal on the inter-frequency or inter-RAT neighboring cell in a measurement window-free measurement manner. Otherwise, the terminal device needs to measure the signal on the inter-frequency or inter-RAT neighboring cell in a measurement window measurement manner. In this case, the terminal device stops signal receiving and sending in the serving cell in a measurement window, adjusts a radio frequency channel to an inter-frequency or inter-RAT frequency, and receives a signal in the inter-frequency or inter-RAT neighboring cell. The measurement window-free measurement or the measurement window measurement is configured by using radio resource control (radio resource control, RRC) signaling.

A carrier aggregation (carrier aggregation. CA) technology may aggregate two to five component carriers (component carrier, CC) together, so that uplink and downlink transmission rates can be effectively improved. The terminal device determines, based on the capability of the terminal device, a maximum quantity of carriers that can be simultaneously used for uplink and downlink transmission. In long term evolution (long term evolution, LTE) CA and new radio (new radio, NR) CA, a primary component carrier (primary carrier component, PCC) and a secondary component carrier (secondary carrier component, SCC) are mainly involved. A primary cell (primary cell, PCell) is a cell to which the terminal device establishes an initial connection, a cell reselected by the terminal device by using RRC signaling, or a primary cell specified in a cell handover process. The PCell is responsible for RRC communication with the terminal device. A carrier unit corresponding to the PCell is referred to as a PCC. A secondary cell (secondary cell, SCell) is a cell added by using RRC reconfiguration signaling, that is, a secondary cell, and is used to provide an additional radio resource. A carrier unit corresponding to the SCell is referred to as an SCC. Activation of the SCC is configured by using media access control control element (medium access control control element, MAC CE) signaling.

If the terminal device performs cell measurement in a measurement window-free measurement manner, after the SCC is activated, a measurement capability of measurement window-free measurement of the terminal device is affected. For example, when the SCC has been configured but has not been activated, the terminal device performs cell measurement in the measurement window-free measurement manner. Once the SCC is activated, the terminal device may continue to perform cell measurement in the measurement window-free measurement manner, and cannot measure a neighboring cell.

SUMMARY

Embodiments of this application provide a measurement configuration method and an apparatus, to resolve a problem that a measurement capability of measurement-free window measurement is affected after an SCC is activated.

According to a first aspect, an embodiment of this application provides a measurement configuration method. The method includes: A network device sends first information to a terminal device. The first information includes configuration information of an SCC. The network device sends second information to the terminal device. The second information includes configuration information of a first measurement window, and the second information is used to enable the terminal device to switch, when supporting CA, from performing cell measurement in a measurement window-free measurement manner to performing cell measurement by using the first measurement window. A carrier included in the CA includes the SCC.

According to the foregoing method, after the network device configures the SCC, the terminal device may switch, based on the second information, from performing cell measurement in the measurement window-free measurement manner to performing cell measurement by using the first measurement window. This can resolve a problem that a measurement capability of measurement-free window measurement is affected after the SCC is activated.

In a possible design, the method further includes: Before the network device sends the second information to the terminal device, the network device sends third information to the terminal device. The third information is used to activate the SCC.

According to the foregoing method, after the network device configures the SCC for the terminal device and before the network device configures the first measurement window for the terminal device, the network device sends the third information to the terminal device. The third information is used to activate the SCC. After the network device sends the third information to the terminal device, the network device sends the second information to the terminal device. Therefore, the first measurement window takes effect immediately, and the network device does not need to send other information to activate the first measurement window.

In a possible design, the method further includes: After the network device sends the second information to the terminal device, the network device sends third information to the terminal device. The third information is used to activate the SCC. The network device determines to activate the first measurement window.

According to the foregoing method, the network device sends the third information to the terminal device. The third information is used to activate the SCC and the first measurement window. Therefore, the network device does not need to send other information to activate the first measurement window.

In a possible design, the method further includes: After the network device sends the first information to the terminal device, the network device starts a first timer. When first preset duration of the first timer expires, the network device determines to activate the first measurement window.

According to the foregoing method, after the network device sends the first information to the terminal device, the network device starts the first timer, and determines, based on the first timer, an occasion for activating the first measurement window.

In a possible design, the method further includes: Before the network device sends the second information to the terminal device, the network device receives fourth information from the terminal device. The fourth information is used to request the network device to configure the first measurement window for the terminal device.

According to the foregoing method, the terminal device may actively request the network device to configure the first measurement window for the terminal device. The network device may query a capability of the terminal device based on the fourth information, and determine whether the first measurement window needs to be configured for the terminal device.

In a possible design, the method further includes: After the SCC is activated, the network device starts a second timer. When second preset duration of the second timer expires, the network device determines to deactivate the first measurement window. The second preset duration is inactive duration corresponding to the SCC.

According to the foregoing method, when determining that the inactive duration corresponding to the SCC expires, the network device may deactivate both the first measurement window and the SCC, so that the terminal device switches from performing cell measurement by using the first measurement window to performing cell measurement in the measurement window-free manner.

In a possible design, the method further includes: The network device sends fifth information to the terminal device. The fifth information is used to indicate the SCC to switch from a non-dormancy behavior to a dormancy behavior. The network device determines to deactivate the first measurement window.

In a possible design, the method further includes: The network device sends sixth information to the terminal device. The sixth information is used to indicate the SCC to switch from the dormancy behavior to the non-dormancy behavior. The network device determines to activate the first measurement window.

According to the foregoing method, the network device may determine to deactivate the first measurement window by switching the SCC from the dormancy behavior to the non-dormancy behavior, and determine to reactivate the first measurement window by switching the SCC from the non-dormancy behavior to the dormancy behavior, so that the terminal device can perform switching of measurement manners in time based on a fact that the SCC is currently in the dormancy behavior or the non-dormancy behavior.

According to a second aspect, an embodiment of this application provides a measurement configuration method. The method includes: A terminal device receives first information from a network device. The first information includes configuration information of an SCC. The terminal device receives second information from the network device. The second information includes configuration information of a first measurement window, and the second information is used to enable the terminal device to switch, when supporting CA, from performing cell measurement in a measurement window-free measurement manner to performing cell measurement by using the first measurement window. A carrier included in the CA includes the SCC.

According to the foregoing method, after the network device configures the SCC, the terminal device may switch, based on the second information, from performing cell measurement in the measurement window-free measurement manner to performing cell measurement by using the first measurement window. This can resolve a problem that a measurement capability of measurement-free window measurement is affected after the SCC is activated.

In a possible design, the method further includes: Before the terminal device receives the second information from the network device, the terminal device receives third information from the network device. The third information is used to activate the SCC.

According to the foregoing method, after the network device configures the SCC for the terminal device and before the network device configures the first measurement window for the terminal device, the network device sends the third information to the terminal device. The third information is used to activate the SCC. After the network device sends the third information to the terminal device, the network device sends the second information to the terminal device. Therefore, the first measurement window takes effect immediately, and the network device does not need to send other information to activate the first measurement window.

In a possible design, the method further includes: After the terminal device receives the second information from the network device, the terminal device receives third information from the network device. The third information is used to activate the SCC. The terminal device determines to activate the first measurement window.

According to the foregoing method, the network device sends the third information to the terminal device. The third information is used to activate the SCC and the first measurement window. Therefore, the network device does not need to send other information to activate the first measurement window.

In a possible design, the method further includes: After the terminal device receives the first information from the network device, the terminal device starts a first timer. When first preset duration of the first timer expires, the terminal device determines to activate the first measurement window.

According to the foregoing method, after the network device sends the first information to the terminal device, the network device starts the first timer, and determines, based on the first timer, an occasion for activating the first measurement window.

In a possible design, the method further includes: Before the terminal device receives the second information from the network device, the terminal device sends fourth information to the network device. The fourth information is used to request the network device to configure the first measurement window for the terminal device.

According to the foregoing method, the terminal device may actively request the network device to configure the first measurement window for the terminal device. The network device may query a capability of the terminal device based on the fourth information, and determine whether the first measurement window needs to be configured for the terminal device.

In a possible design, the method further includes: After the SCC is activated, the terminal device starts a second timer. When second preset duration of the second timer expires, the terminal device determines to deactivate the first measurement window. The second preset duration is inactive duration corresponding to the SCC.

According to the foregoing method, when determining that the inactive duration corresponding to the SCC expires, the terminal device may deactivate both the first measurement window and the SCC, so that the terminal device switches from performing cell measurement by using the first measurement window to performing cell measurement in the measurement window-free manner.

In a possible design, the method further includes: The terminal device receives fifth information from the network device. The fifth information is used to indicate the SCC to switch from a non-dormancy behavior to a dormancy behavior. The terminal device determines to deactivate the first measurement window.

In a possible design, the method further includes: The terminal device receives sixth information from the network device. The sixth information is used to indicate the SCC to switch from the dormancy behavior to the non-dormancy behavior. The terminal device determines to activate the first measurement window.

According to the foregoing method, the terminal device may determine to deactivate the first measurement window by switching the SCC from the dormancy behavior to the non-dormancy behavior, and determine to reactivate the first measurement window by switching the SCC from the non-dormancy behavior to the dormancy behavior, so that the terminal device can perform switching of measurement manners in time based on a fact that the SCC is currently in the dormancy behavior or the non-dormancy behavior.

In a possible design, the method further includes: After the SCC is activated, the terminal device skips transmitting data through the CA, and the terminal device performs cell measurement in the measurement window-free measurement manner.

According to the foregoing method, the terminal device may actively roll back the SCC.

According to a third aspect, an embodiment of this application provides a measurement configuration apparatus. The apparatus includes a transceiver unit and a processing unit, and the processing unit invokes the transceiver unit to: send first information to a terminal device, where the first information includes configuration information of an SCC; and send second information to the terminal device, where the second information includes configuration information of a first measurement window, and the second information is used to enable the terminal device to switch, when supporting CA, from performing cell measurement in a measurement window-free measurement manner to performing cell measurement by using the first measurement window, where a carrier included in the CA includes the SCC.

In a possible design, the transceiver unit is configured to: before sending the second information to the terminal device, send third information to the terminal device. The third information is used to activate the SCC.

In a possible design, the transceiver unit is configured to: after sending the second information to the terminal device, send third information to the terminal device. The third information is used to activate the SCC.

The processing unit is configured to determine to activate the first measurement window.

In a possible design, the transceiver unit is configured to: before sending the second information to the terminal device, receive fourth information from the terminal device. The fourth information is used to request the apparatus to configure the first measurement window for the terminal device.

In a possible design, the processing unit is configured to: after the SCC is activated, start a second timer; and when second preset duration of the second timer expires, determine to deactivate the first measurement window. The second preset duration is inactive duration corresponding to the SCC.

In a possible design, the transceiver unit is configured to send fifth information to the terminal device. The fifth information is used to indicate the SCC to switch from a non-dormancy behavior to a dormancy behavior.

The processing unit is configured to determine to deactivate the first measurement window.

In a possible design, the transceiver unit is configured to send sixth information to the terminal device. The sixth information is used to indicate the SCC to switch from the dormancy behavior to the non-dormancy behavior.

The processing unit is configured to determine to activate the first measurement window.

It should be understood that, for technical effects of the third aspect and the designs in the third aspect, refer to technical effects of the first aspect and the corresponding designs in the first aspect. Repeated content is not described again.

According to a fourth aspect, an embodiment of this application provides a measurement configuration apparatus. The apparatus includes a transceiver unit and a processing unit, and the processing unit invokes the transceiver unit to: receive first information from a network device, where the first information includes configuration information of an SCC; and receive second information from the network device, where the second information includes configuration information of a first measurement window, and the second information is used to enable a terminal device to switch, when supporting CA, from performing cell measurement in a measurement window-free measurement manner to performing cell measurement by using the first measurement window, where a carrier included in the CA includes the SCC.

In a possible design, the transceiver unit is configured to: before receiving the second information from the network device, receive third information from the network device. The third information is used to activate the SCC.

In a possible design, the transceiver unit is configured to: after receiving the second information from the network device, receive third information from the network device. The third information is used to activate the SCC. The processing unit is configured to determine to activate the first measurement window.

In a possible design, the transceiver unit is configured to: before receiving the second information from the network device, send fourth information to the network device. The fourth information is used to request the network device to configure the first measurement window for the terminal device.

In a possible design, the processing unit is configured to: after the SCC is activated, start a second timer; and when second preset duration of the second timer expires, determine to deactivate the first measurement window. The second preset duration is inactive duration corresponding to the SCC.

In a possible design, the transceiver unit is configured to receive fifth information from the network device. The fifth information is used to indicate the SCC to switch from a non-dormancy behavior to a dormancy behavior. The processing unit is configured to determine to deactivate the first measurement window.

In a possible design, the transceiver unit is configured to receive sixth information from the network device. The sixth information is used to indicate the SCC to switch from the dormancy behavior to the non-dormancy behavior. The processing unit is configured to determine to activate the first measurement window.

In a possible design, the processing unit is configured to: after the SCC is activated, skip transmitting data through the CA, and perform cell measurement in the measurement window-free measurement manner.

It should be understood that, for technical effects of the fourth aspect and the designs in the fourth aspect, refer to technical effects of the second aspect and the corresponding designs in the second aspect. Repeated content is not described again.

According to a fifth aspect, this application further provides a computer-readable storage medium. The computer-readable storage medium stores a computer program. When the computer program runs on a computer, the computer is enabled to perform the method according to the first aspect or the second aspect.

According to a sixth aspect, this application further provides a computer program product including a program. When the computer program product runs on a computer, the computer is enabled to perform the method according to the first aspect or the second aspect.

According to a seventh aspect, this application further provides a communications apparatus, including a processor and a memory. The memory is configured to store computer-executable instructions, and the processor is configured to execute the computer-executable instructions stored in the memory, to enable the communications apparatus to perform the method according to the first aspect or the second aspect.

According to an eighth aspect, an embodiment of this application further provides a communications apparatus, including a processor and an interface circuit. The interface circuit is configured to receive code instructions and transmit the code instructions to the processor, and the processor runs the code instructions, to perform the method according to the first aspect and the second aspect.

According to a ninth aspect, this application further provides a network system. The communications system includes a terminal device and a network device, the network device performs the method according to the first aspect, and the terminal device performs the method according to the second aspect.

DESCRIPTION OF EMBODIMENTS

The following describes embodiments of this application with reference to the accompanying drawings.

Figure 1:
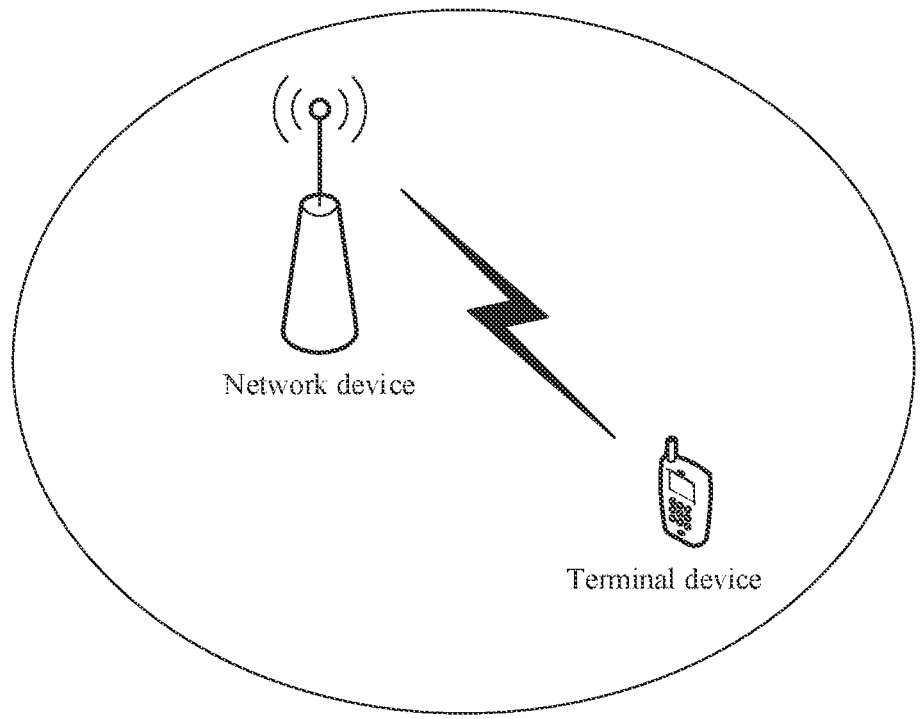
FIG. 1 is a schematic diagram of a structure of a communications system according to an embodiment of this application.

Network elements in embodiments of this application include a network device and a terminal device, as shown in FIG. 1.

The network device is an entity used to transmit or receive a signal on a network side, for example, a new-generation NodeB (generation NodeB, gNodeB). The network device may be a device configured to communicate with a mobile device. The network device may be an AP in a wireless local area network (wireless local area network, WLAN), a base transceiver station (base transceiver station, BTS) in a global system for mobile communications (global system for mobile communications, GSM) or code division multiple access (code division multiple access, CDMA), a NodeB (NodeB, NB) in wideband code division multiple access (Wideband Code Division Multiple Access, WCDMA), an evolved NodeB (evolved NodeB, eNB or eNodeB) in LTE, a relay station, an access point, integrated access and backhaul (integrated access and backhaul, IAB), a vehicle-mounted device, a wearable device, a network device in a future network, a network device in a future evolved public land mobile network (public land mobile network, PLMN) network, or a gNodeB in an NR system, or the like. In addition, in embodiments of this application, the network device provides a service to a cell, and the terminal device communicates with the network device by using a transmission resource (such as a frequency domain resource or a spectrum resource) used by the cell. The network device in embodiments of this application may be a central unit (central unit, CU) or a distributed unit (distributed unit, DU), or the network device may be a CU and a DU. The CU and the DU may be physically separated, or may be deployed together. This is not specifically limited in embodiments of this application. One CU may be connected to one DU, or a plurality of DUs may share one CU to reduce costs and facilitate network expansion. The CU and the DU may be split based on a protocol stack. In a possible manner, RRC, a service data adaptation protocol (service data adaptation protocol, SDAP) stack, and a packet data convergence protocol (packet data convergence protocol, PDCP) layer are deployed in the CU, and a radio link control (radio link control, RLC) layer, a media access control (media access control, MAC) layer, and a physical layer are deployed in the DU. In the present invention, the foregoing method for splitting the protocol stack is not completely limited, and there may be another splitting method. The CU is connected to the DU through an F1 interface. The CU indicates that the gNB is connected to a core network through an Ng interface. The network device in embodiments of this application may be a centralized unit control plane (CU-CP) node or a centralized unit user plane (CU-UP) node, or the network device may be a CU-CP and a CU-UP. The CU-CP is responsible for a control plane function, and mainly includes the RRC and PDCP-C. The PDCP-C is mainly responsible for data encryption and decryption, integrity protection, data transmission, and the like on a control plane. The CU-UP is responsible for user plane functions, and mainly includes the SDAP and PDCP-U. The SDAP is mainly responsible for processing data of the core network and mapping a flow to a bearer. The PDCP-U is mainly responsible for encryption and decryption, integrity protection, header compression, serial number maintenance, data transmission, and the like on a data plane. The CU-CP is connected to the CU-UP through an E1 interface. The CU-CP indicates that the gNB is connected to the core network through the Ng interface, and is connected to the DU through an F1-C (the control plane). The CU-UP is connected to the DU through an F1-U (the user plane). Certainly, in another possible implementation, the PDCP-C is also in the CU-UP. An access network device mentioned in embodiments of this application may be a device including the CU or the DU, or a device including the CU and the DU, or a device including the control plane CU node (the CU-CP node), the user plane CU node (the CU-UP node), and a DU node. In addition, in another possible case, the network device may be another apparatus that provides a wireless communication function for the terminal device. A specific technology and a specific device form that are used by the network device are not limited in embodiments of this application. For ease of description, in embodiments of this application, the apparatus that provides the wireless communication function for the terminal device is referred to as a network device.

The terminal device may be a wireless terminal device that can receive scheduling and indication information of the network device. The wireless terminal device may be a device that provides a user with voice and/or data connectivity, a handheld device having a wireless connection function, or another processing device connected to a wireless modem. The wireless terminal device may communicate with one or more core networks or the internet through a radio access network (radio access network, RAN). The wireless terminal device may be a mobile terminal device such as a mobile phone (also referred to as a "cellular" phone or a mobile phone (mobile phone)), a computer, and a data card. For example, the wireless terminal device may be a portable, pocket-sized, handheld, computer built-in, or vehicle-mounted mobile apparatus that exchanges language and/or data with the radio access network. For example, the terminal device may be a device such as a personal communications service (personal communications service, PCS) phone, a cordless phone, a session initiation protocol (session initiation protocol) phone, a wireless local loop (wireless local loop, WLL) station, a personal digital assistant (personal digital assistant, PDA), a tablet (Pad), or a computer with a wireless transceiver function. The wireless terminal device may also be referred to as a system, a subscriber unit (subscriber unit), a subscriber station (subscriber station), a mobile station (mobile station), a mobile station (mobile station, MS), a remote station (remote station), an access point (access point, AP), a remote terminal (remote terminal) device, an access terminal (access terminal) device, a user terminal (user terminal) device, a user agent (user agent), a subscriber station (subscriber station, SS), customer premises equipment (customer premises equipment, CPE), a terminal (terminal), user equipment (user equipment, UE), a mobile terminal (mobile terminal, MT), or the like. The wireless terminal device may also be a wearable device and a next-generation communications system.

In addition, embodiments of this application may further be applicable to another future-oriented communications technology. A network architecture and a service scenario described in this application are intended to describe the technical solutions in this application more clearly, and do not constitute a limitation on the technical solutions provided in this application. Persons of ordinary skill in the art may know that, as a network architecture evolves and a new service scenario emerges, the technical solutions provided in this application are also applicable to a similar technical problem.

Figure 2:
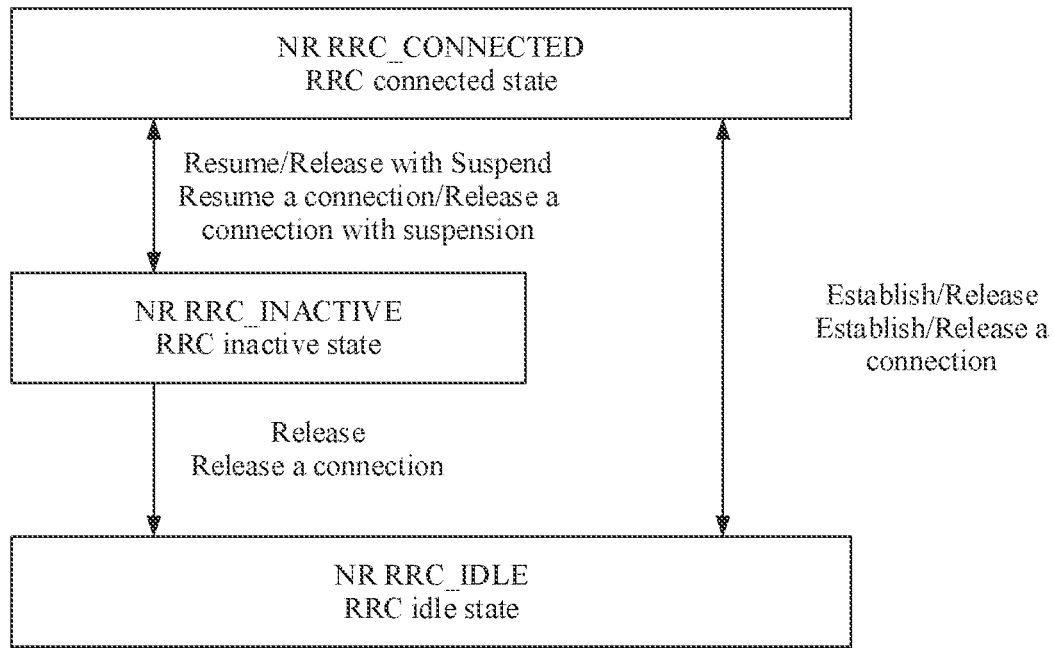
FIG. 2 is a schematic diagram of transition between RRC statuses according to an embodiment of this application.
Figure 3:
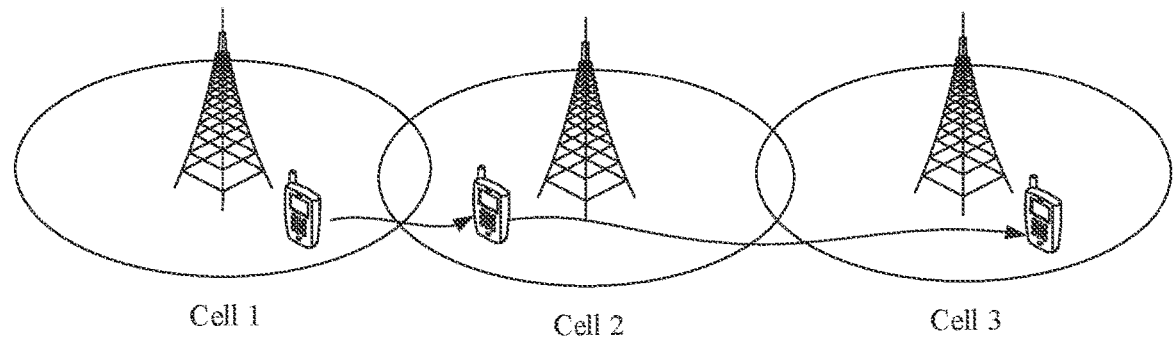
FIG. 3 is a schematic diagram in which UE moves between a plurality of cells according to an embodiment of this application.

In the NR system, RRC statuses of the UE include a connected (RRC_CONNECTED) state, an inactive (RRC_INACTIVE) state, and an idle (RRC_IDLE) state. FIG. 2 shows transition between the three states. Compared with 4G LTE in which there are only two RRC states: RRC_IDLE and RRC_CONNECTED, NR introduces a new state: RRC INACTIVE, to meet a requirement of low latency and low power consumption. FIG. 3 shows a schematic diagram of RRC statuses of the UE and transition. The UE in the idle state may establish an RRC connection, switch to the connected state, and roll back to the idle state by releasing the RRC connection. When the UE in the connected state is in a low-demand state, the UE may release the RRC connection with suspension, to switch to the inactive state, and roll back to the idle state by releasing the RRC connection.

In a mobile communications network, performing mobility management on the terminal device is an important topic. The terminal device performs reselection and handover between cells with different coverage areas, to obtain continuous services of wireless networks. Based on different RRC statuses between the terminal device and the network device, when the terminal device is in the idle state or the inactive state, there is no RRC connection between the terminal device and the network device. When signal quality of a cell on which the terminal device camps is lower than a specific threshold, the terminal device measures signal quality of the cell on which the terminal device camps and a neighboring cell based on intra-frequency, inter-frequency, and/or inter-RAT neighboring cell information configured by the network device in a system message, to determine whether the signal quality of the neighboring cell meets a cell reselection condition. If the signal quality of the neighboring cell meets the cell reselection condition, the terminal device camps on the neighboring cell. When the terminal device is in the connected state, there is an RRC connection between the terminal device and the network device, and the network device configures, by using RRC signaling, the terminal device to perform intra-frequency, inter-frequency, and/or inter-RAT neighboring cell measurement. The terminal device reports signal quality measurement results of a serving cell and a neighboring cell to the network device by using RRC signaling, and then the network device hands over the terminal device to a cell with better signal quality based on the measurement result of the terminal device. Therefore, both cell reselection (Reselection) in the idle state and the inactive state and cell handover (Handover) in the connected state are based on the signal quality measurement results of the serving cell and the neighboring cell by the terminal device. FIG. 3 is a schematic diagram in which the UE moves between a cell 1, a cell 2, and a cell 3.

For inter-frequency and/or inter-RAT neighboring cell measurement in the connected state, based on a capability of the terminal device, the terminal device may measure the inter-frequency and/or inter-RAT neighboring cell in a measurement window-free measurement manner and a measurement window measurement manner. A measurement window may also be referred to as a measurement gap. The measurement window is configured by the network device. In the measurement window, the network device does not schedule, in the serving cell, downlink receiving and uplink sending of a terminal. Therefore, no uplink or downlink bit error is caused in the measurement window. The network device semi-persistently configures the measurement window by using RRC signaling. Once the measurement window is configured by using the RRC signaling, the measurement window periodically appears at a fixed offset location until the measurement window is configured again by using RRC signaling. For inter-frequency and/or inter-RAT neighboring cell measurement in the idle state or in the inactive state, because the terminal device does not need to send and receive data in the camped cell, a measurement window may not need to be configured.

Figure 4:
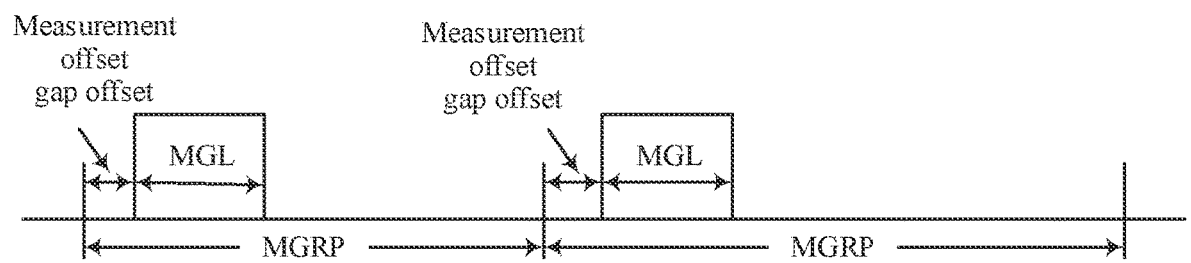
FIG. 4 is a schematic diagram of configuration parameters of a measurement window according to an embodiment of this application.

FIG. 4 is a schematic diagram of configuration parameters of a measurement window, mainly including three parameters, a measurement gap repetition period (measurement gap repetition period, MGRP) used to configure a period of a measurement window, a measurement gap length (measurement gap length, MGL) used to configure a length of a measurement window, and a measurement offset (gapOffset) used to configure a start location of a measurement window. According to the three parameters, it may be determined that the measurement window starts on a system frame number (system frame number, SFN) and a subframe (subframe) that meet the following conditions:

SFN mod $T$=FLOOR(gapOffset/10).

subframe=gapOffset mod 10.

$T$=MGRP/10.

The SFN and the subframe are an SFN and a subframe of a primary cell (primary cell, PCell). A maximum MGL is 6 ms.

According to an NR protocol, for LTE and NR that belong to a same frequency range (frequency Range, FR), in a scenario in which a terminal device located in an LTE system measures the NR, a terminal device located in a 4G radio access network and NR dual connectivity (EUTRA-NR dual connectivity, EN-DC) system measures LTE inter-frequency and the EN-DC measures NR inter-frequency, a terminal device located in a standalone (Standalone, SA) system measures the NR inter-frequency, a terminal device located in the SA system measures an LTE inter-RAT, or the like, the network device needs to configure a measurement window to assist in measurement. In a same FR, all frequencies in an NR measurement window are configured in a unified manner. If independent configuration of measurement windows for FR 1 and FR 2 is not supported, a unified UE-level measurement window needs to be configured during measurement. If independent configuration of measurement windows for FR 1 and FR 2 is supported, a measurement window is separately configured for all bands of FR 1 or FR 2. Details may be shown in Table 1.

TABLE 1 gapFR1: indicates measurement window configuration applicable only to FR 1. In EN-DC, gapFR1 cannot be set by NR RRC (only LTE RRC can configure gapFR1). gapFR1 cannot be configured together with gapUE. For details, see Table 9.1.2-2 in TS 38.133.
gapFR2: indicates measurement window configuration applicable only to FR 2. gapFR2 cannot be configured together with gapUE. For details, see Table 9.1.2-1 and Table 9.1.2-2 in TS 38.133.
gapUE: indicates measurement window configuration applicable to all frequencies (FR 1 and FR 2). In the case of EN-DC, gapUE cannot be set by NR RRC (that is, only LTE RRC can configure a measurement window for each UE). If gapUE is configured, neither gapFR1 nor gapFR2 can be configured. For details, see Table 9.1.2-2 in TS 38.133.

Measurement performed by the terminal device on an NR neighboring cell may be based on a synchronization signal block (synchronization signal block, SSB). However, due to a special design of an SSB signal, if the inter-frequency or inter-RAT neighboring cell measurement in the connected state is performed in the measurement window measurement manner, the network device needs to configure a measurement window that includes a sending time period of an SSB of a neighboring cell.

A time domain location of the measurement window refers to timing of the PCell, and a time domain location of the SSB is sent based on timing of the NR neighboring cell. To configure a correct measurement window location, the network device needs to know a timing difference between the PCell and the NR neighboring cell, to determine that an SFN and a subframe number of the SSB of the NR neighboring cell correspond to an SFN and a subframe number of the PCell. The timing difference between the PCell and the NR neighboring cell may be obtained by measuring a system frame number and frame timing difference (SFN and frame timing difference, SFTD) of the terminal device. An SFTD measurement result includes a difference of the SFN and a timing difference of a frame boundary. The current protocol supports SFTD measurement between an LTE PCell and an NR PSCell in EN-DC, between an NR PCell and an LTE PSCell in NR and 4G radio access network dual connectivity (NR-EUTRA dual connectivity, NE-DC), between an NR PCell and an NR PSCell in NR and NR dual connectivity NR-DC (NR dual connectivity, NR-DC), and between an LTE PCell and an NR neighboring cell in non-dual connectivity (dual connectivity. DC). When performing SFTD measurement, the terminal device needs to receive a signal of another measured cell in addition to the PCell, to obtain timing information of the cell. In a DC scenario, the terminal device can support working on a PCell and a PSCell simultaneously, and know timing information of the PCell and the PSCell at any moment. Therefore, SFTD measurement is not difficult. For SFTD measurement between an LTE PCell and an NR neighboring cell in a non-DC scenario, if a radio frequency channel of the terminal device does not support receiving a signal on the neighboring NR cell when receiving and transmitting a signal on the PCell, the SFTD measurement is difficult. The current protocol supports the following two manners: SFTD measurement that requires a gap and SFTD measurement in connected discontinuous reception (connected discontinuous reception, CDRX) in inactive time.

In the measurement window, the UE first detects a synchronization signal of another cell, synchronizes with the another cell by using the synchronization signal of the another cell, and then performs related measurement on a reference signal sent by the another cell, to complete measurement on the another cell. If data receiving and sending of an original serving cell are interrupted in the measurement window, a throughput is greatly affected.

False or True is used to indicate whether a measurement window is needed for measuring an inter-frequency band by using a CA combination. True indicates that a measurement window is needed, and False indicates that a measurement window is not needed. The network device determines, based on a capability reported by the terminal device, whether to configure a measurement window during measurement. For example, in Table 2, a CA combination including Band 1 and Band 1a does not need a measurement window, a CA combination including Band 3 and Band 1a does not need a measurement window, a CA combination including Band 5 and Band 1a needs a measurement window, a CA combination including Band 38 and Band 1a needs a measurement window, and a CA combination including Band 39 and Band 1a needs a measurement window.

TABLE 2

| CA combination\interFreqNeedForGaps | Band 1a | Band 3a | Band 5a | Band 38a | Band 39a | Band 1a + Band 1a | Band 1a + Band 5a | Band 1a + Band 40a | Band 1a + Band 3a + Band 5a | Band 3a + Band 40a |
|---|---|---|---|---|---|---|---|---|---|---|
| Band 1 | F | F | T | T | T | T | T | T | T | T |
| Band 3 | F | F | F | F | F | F | F | F | F | F |
| Band 5 | T | T | F | F | F | F | F | F | F | F |
| Band 38 | T | T | T | T | T | F | T | F | T | F |
| Band 39 | T | F | T | T | T | T | T | T | T | T |

T: A gap is needed.
F: No gap is needed.

Currently, an LTE terminal device may support a plurality of CA combinations of different bands. The terminal device has a plurality of receiving channels, and has a capability of directly measuring an inter-frequency/inter-RAT without a need to configure a measurement window. In this way, data transmission in the original serving cell may not be interrupted, and data receiving and sending of the original serving cell of the terminal device are not affected.

However, LTE supports a plurality of bands and CA combinations, and there are also a plurality of inter-frequency/inter-RAT bands that need to be measured. Considering costs, the terminal device usually supports only a limited quantity of band combinations, and in an unsupported band combination, a measurement window is required to measure the inter-frequency/inter-RAT.

According to the current protocol, in LTE, the terminal device may report, in a capability message by using an interFreqNeedForGaps/interRAT-NeedForGaps (interFreqNeedForGaps/interRAT-NeedForGaps) information element, which measurement band combinations need a measurement window and which measurement band combinations do not need a measurement window. Specifically, a band (band) of the serving cell is indicated by a band list (bandListEUTRA) (a supported single band) supported by LTE or a band combination list (bandCombinationListEUTRA) (supported CA) supported by LTE. A target measurement inter-frequency band is indicated by an inter-frequency band list (interFreqBandList), and a target measurement inter-RAT band is indicated by an inter-RAT band list (interRAT-BandList). As shown in Table 2, one bit A quantity of bits of the capability message reported by the terminal device is relatively large, and an amount of information is relatively large. Assuming that N is a quantity of bands supported by the terminal device, M is a quantity of inter-RAT bands supported by the terminal device, and L is a quantity of LTE CA combinations supported by the terminal device, a quantity of information bits that need to be reported is (N+L)*(N+M). For example, the UE may support 500 CA combinations, measurement of 20 inter-frequency ranges, and measurement of 10 inter-RAT bands. In this case, a quantity of bits of the message that needs to be reported is 15,600 bits, an amount of information is large, and errors are relatively likely to occur.

Currently, the reported capability message does not support the reporting of a measurement-free window capability of the NR. NR supports more bands, and supports more band combinations such as EN-DC or NR and 4G radio access network dual connectivity (NE-DC), and NR CA. Measurement needs to be performed on the NR inter-frequency and the LTE inter-RAT. In non-standalone (non-standalone, NSA) networking, measurement also needs to be performed on another inter-RAT, such as a 2G system or a 3G system. Therefore, more inter-frequency and inter-RAT measurement needs to be performed, and it is more difficult for the terminal device to support inter-frequency or inter-RAT measurement without configuring a measurement window in all band combinations. It is similar to reporting, based on LTE frequency ranges, whether a measurement window needs to be configured. In the NR system, measuring the inter-frequency and the inter-RAT by using the measurement window also affect throughputs of LTE and NR in NSA or SA. In the NR system, the terminal device also needs to report whether each measurement band combination needs to be measured by using the measurement window.

Figure 5:
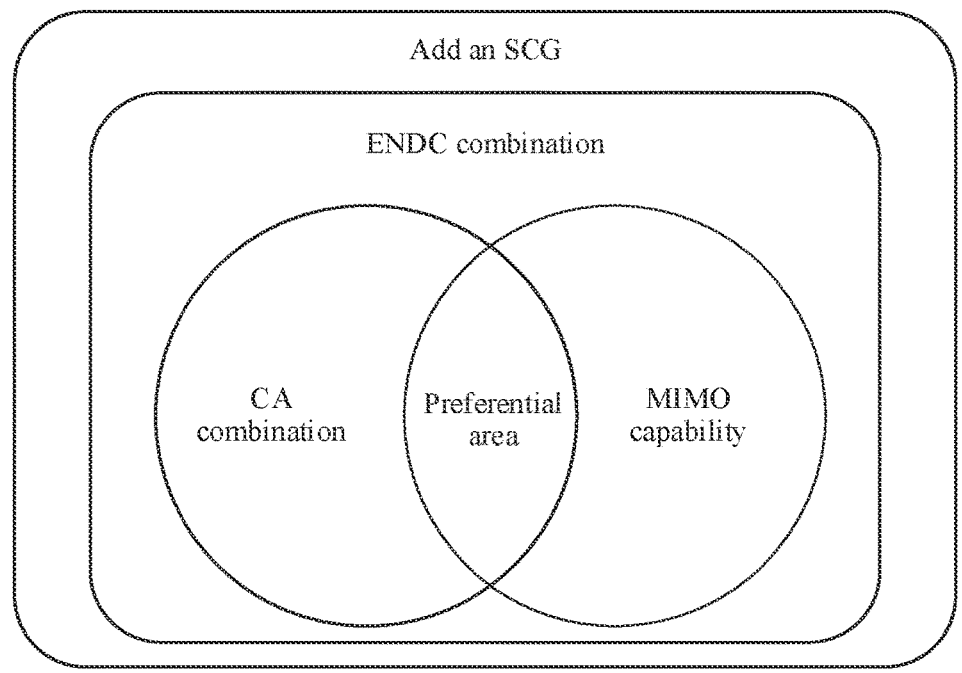
FIG. 5 is a schematic diagram of adding an SCG by a network device based on a capability reported by a terminal device according to an embodiment of this application.

In an EN_DC combination, some have a relatively strong CA capability and a relatively strong multiple-input multiple-output (multiple-input multiple-output, MIMO) capability. Such a combination should be preferentially selected to add a secondary cell (secondary cell group, SCG), as shown in FIG. 5. Otherwise, when the network device fails to add the SCG, the network device needs to be forced to roll back the CA capability and the MIMO capability.

Different from a conventional active state and disabled state, the SCell introduces a new state, that is, a dormancy behavior (dormancy behavior) or a dormancy state. In addition, a new state is added to the SCC corresponding to the SCell. The dormancy behavior allows measurement and reporting of periodic channel state information (channel state information, CSI) of the SCell, but other aspects are similar to the conventional disabled state. A non-dormancy behavior (non-dormancy behavior) is similar to the conventional disabled state. A wait time for entering or exiting the dormancy state should be shorter than a wait time for SCell activation or deactivation.

When the SCC or the SCell is in the dormancy behavior, no data transmission or PDCCH monitoring is expected on the SCell. Other periodic activities on the SCell (including CSI measurement and reporting, beam management, radio resource management (radio resource management, RRM)) can still be performed at a significantly reduced duty cycle, but can be very fast at a level that allows transition to the non-dormancy behavior. An advantage is that, compared with a wait time for transition from the disabled state to the active state, a wait time for transition from the dormancy behavior to the non-dormancy behavior is greatly reduced. In the dormancy behavior, power consumption of the terminal device is far lower than power consumption of the terminal device in the non-dormancy behavior, and may be slightly higher than power consumption in the disabled state. Fast state switching from a low power state to a high power state can reduce the power consumption of the terminal device. The dormancy behavior can be seen herein as a method for "pausing" SCell operation to achieve moderate power saving.

Based on this, this application provides a measurement configuration method, to resolve a problem that a measurement capability of measurement window-free measurement is affected after an SCC is activated. The method may be applied to a communications system. The system includes a terminal device and a network device. The terminal device is connected to a first network device by using a first link, the terminal device is in a connected state, and the terminal device performs cell measurement in a measurement window-free manner.

Figure 6:
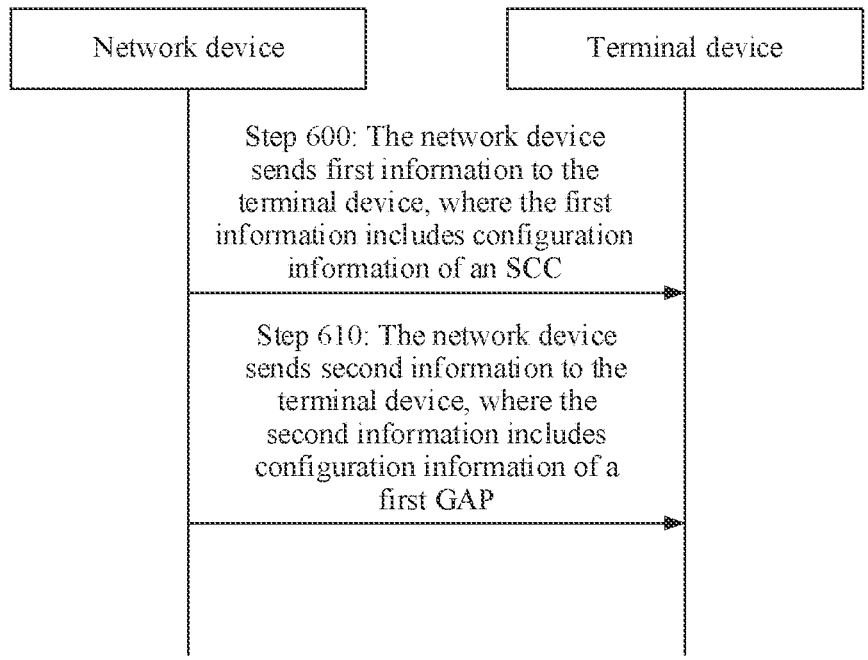
FIG. 6 is an overview flowchart 1 of a measurement configuration method according to an embodiment of this application.

As shown in FIG. 6, the method includes the following steps.

Step 600: The network device sends first information to the terminal device, where the first information includes configuration information of an SCC.

Correspondingly, the terminal device receives the first information from the network device.

For example, the first information may be a system information block (system information block, SIB) message, and the SIB message may be carried by using RRC signaling, for example, an RRC configuration message. The first information includes an NR information element (CA-ParametersNR information element) of a CA parameter. For example, the first information may include a plurality of CA parameters, for example, parameters such as a cross-band CA combination parameter.

Step 610: The network device sends second information to the terminal device, where the second information includes configuration information of a first measurement window. The second information is used to enable the terminal device to switch, when supporting CA, from performing cell measurement in a measurement window-free measurement manner to performing cell measurement by using the first measurement window, where a carrier included in the CA includes the SCC.

Correspondingly, the terminal device receives the second information from the network device.

For example, the second information may be measurement configuration information, or the second information may be carried by using the RRC signaling, for example, an RRC configuration message. The second information includes a measurement configuration information element (MeasConfig information element). For example, the second information may include parameters such as an MGRP of the first measurement window, an MGL of the first measurement window, and a gapOffset of the first measurement window.

According to the foregoing method, after the network device configures the SCC for the terminal device, the network device may further configure the first measurement window for the terminal device. Therefore, the terminal device may switch, based on the second information, from performing cell measurement in the measurement window-free measurement manner to performing cell measurement by using the first measurement window. This can resolve the problem that the measurement capability of the terminal device in the measurement window-free measurement is affected after the SCC is activated, and can avoid SCC rollback and performance loss, to ensure that a data throughput is not affected.

Figure 7:
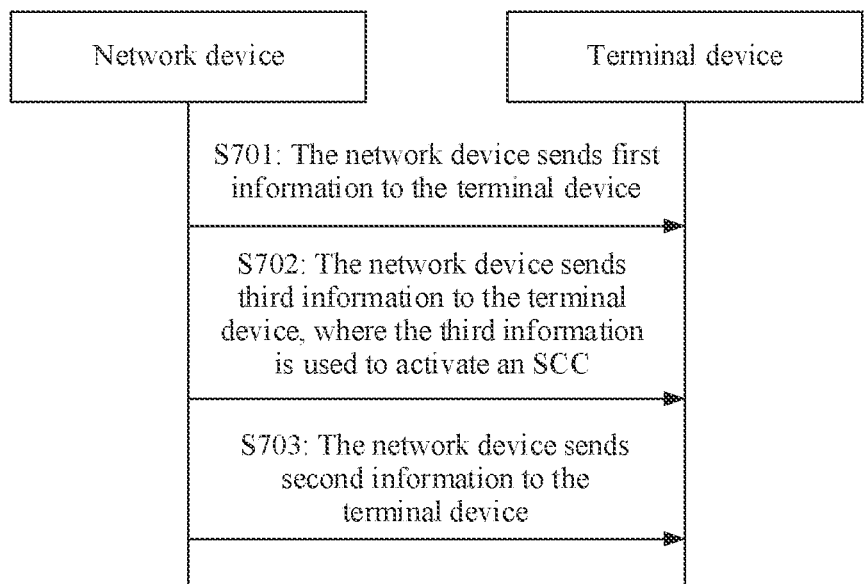
FIG. 7 is an overview flowchart 2 of a measurement configuration method according to an embodiment of this application.
Figure 8:
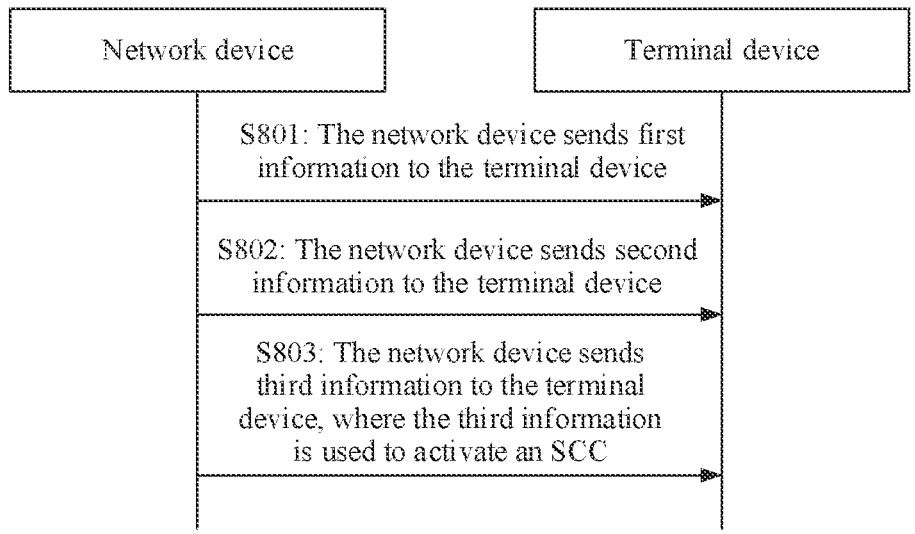
FIG. 8 is an overview flowchart 3 of a measurement configuration method according to an embodiment of this application.
Figure 9:
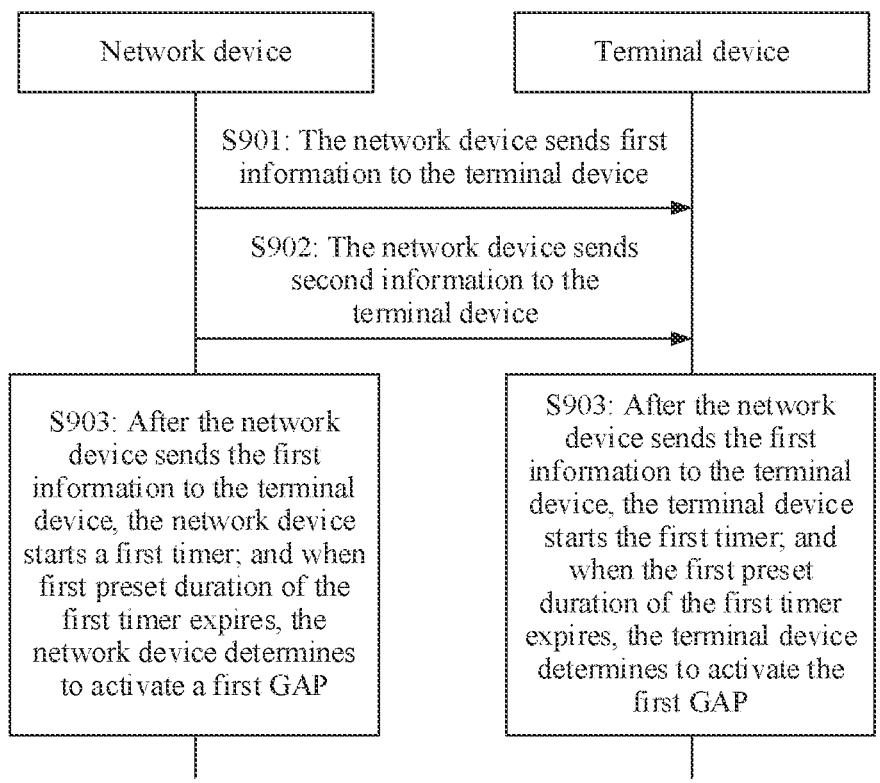
FIG. 9 is an overview flowchart 4 of a measurement configuration method according to an embodiment of this application.

As shown in FIG. 7 to FIG. 9, the following describes the measurement configuration method shown in FIG. 6 with reference to specific embodiments.

As shown in FIG. 7, an embodiment of this application provides a measurement configuration method. The method includes the following steps.

S701: A network device sends first information to a terminal device.

Correspondingly, the terminal device receives the first information from the network device.

S702: The network device sends third information to the terminal device, where the third information is used to activate an SCC.

Correspondingly, the terminal device receives the third information from the network device.

The third information may be carried by using MAC CE signaling, RRC signaling, or downlink control information (downlink control information, DCI) signaling.

For example, the third information may further include an inactive time corresponding to the SCC.

S703: The network device sends second information to the terminal device.

Correspondingly, the terminal device receives the second information from the network device.

In a possible design, before the network device sends the second information to the terminal device, the network device receives fourth information from the terminal device. The fourth information is used to request the network device to configure a first measurement window for the terminal device. The network device may query a capability of the terminal device based on the fourth information, and determine whether the first measurement window needs to be configured for the terminal device.

The fourth information may be carried based on uplink control information (uplink control information, UCI).

It should be understood that the terminal device may send the fourth information to the network device after receiving the first information from the network device. Alternatively, the terminal device may send the fourth information to the network device after receiving the third information from the network device.

According to the foregoing method, after the network device configures the SCC for the terminal device and before the network device configures the first measurement window for the terminal device, the network device sends the third information to the terminal device. The third information is used to activate the SCC. After the network device sends the third information to the terminal device, the network device sends the second information to the terminal device. Therefore, the first measurement window takes effect immediately, the network device does not need to send other information to activate the first measurement window, and the terminal device switches, based on the second information, from performing cell measurement in a measurement window-free measurement manner to performing cell measurement by using the first measurement window. This can resolve a problem that a measurement capability of the measurement-free window measurement of the terminal device is affected after the SCC is activated.

As shown in FIG. 8, an embodiment of this application provides a measurement configuration method. The method includes the following steps.

S801: A network device sends first information to a terminal device.

Correspondingly, the terminal device receives the first information from the network device.

S802: The network device sends second information to the terminal device.

Correspondingly, the terminal device receives the second information from the network device.

For example, the first information and the second information may be sent simultaneously or separately.

In a possible design, before the network device sends the second information to the terminal device, the network device receives fourth information from the terminal device. The fourth information is used to request the network device to configure a first measurement window for the terminal device.

It should be understood that the terminal device may send the fourth information to the network device after receiving the first information from the network device.

S803: The network device sends third information to the terminal device, where the third information is used to activate an SCC.

Step 803 is performed after step 802. The network device activates the SCC based on the third information, and activates the first measurement window simultaneously. After the network device sends the third information to the terminal device, the network device determines to activate the SCC and the first measurement window. Correspondingly, after the terminal device receives the third information from the network device, the terminal device determines to activate the SCC and the first measurement window.

According to the foregoing method, the network device sends the third information to the terminal device. The third information is used to activate the SCC and the first measurement window. Therefore, the network device does not need to send other information to activate the first measurement window. After determining that the first measurement window is activated, the terminal device switches, based on the second information, from performing cell measurement in a measurement window-free measurement manner to performing cell measurement by using the first measurement window. This can resolve a problem that a measurement capability of the measurement window-free measurement of the terminal device is affected after the SCC is activated.

As shown in FIG. 9, an embodiment of this application provides a measurement configuration method. The method includes the following steps.

S901: A network device sends first information to a terminal device.

S902: The network device sends second information to the terminal device.

In a possible design, before the network device sends the second information to the terminal device, the network device receives fourth information from the terminal device. The fourth information is used to request the network device to configure a first measurement window for the terminal device.

It should be understood that the terminal device may send the fourth information to the network device after receiving the first information from the network device.

S903: After the network device sends the first information to the terminal device, the network device starts a first timer; and when first preset duration of the first timer expires, the network device determines to activate the first measurement window.

Correspondingly, after the terminal device receives the first information from the network device, the terminal device starts the first timer; and when the first preset duration of the first timer expires, the terminal device determines to activate the first measurement window.

It should be understood that the network device sends the second information to the terminal device before the network device determines that the first preset duration expires. In addition, before the network device determines that the first preset duration expires, the network device sends third information to the terminal device. The third information is used to activate an SCC.

According to the foregoing method, after the network device sends the first information to the terminal device, the network device starts the first timer, and determines, based on the first timer, an occasion for activating the first measurement window. In addition, after the terminal device receives the first information from the network device, the terminal device starts the first timer, and determines, based on the first timer, the occasion for activating the first measurement window. After determining that the first measurement window is activated, the terminal device switches, based on the second information, from performing cell measurement in a measurement window-free measurement manner to performing cell measurement by using the first measurement window. This can resolve a problem that a measurement capability of the measurement window-free measurement of the terminal device is affected after the SCC is activated.

Figure 10:
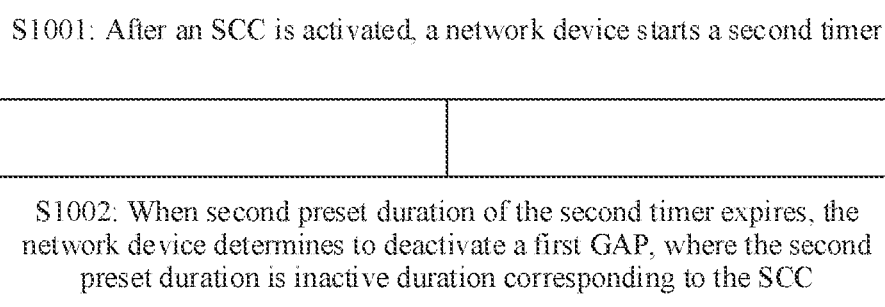
FIG. 10 is an overview flowchart 1 of a method for deactivating a measurement window according to an embodiment of this application.

Further, based on the embodiment shown in FIG. 6 and the embodiments shown in FIG. 7 to FIG. 9, this application further provides a method for deactivating a measurement window, so that when an SCC is unavailable, a terminal device switches from a measurement window measurement manner to a measurement window-free measurement manner, as shown in FIG. 10. The method includes the following steps.

S1001: After the SCC is activated, a network device starts a second timer.

For example, the network device sends MAC CE signaling to the terminal device. The MAC CE signaling is used to activate the SCC. After determining that the SCC is activated, the network device starts the second timer.

S1002: When second preset duration of the second timer expires, the network device determines to deactivate the first measurement window, where the second preset duration is inactive duration corresponding to the SCC.

Correspondingly, after determining that the SCC is activated, the terminal device starts the second timer. When the second preset duration of the second timer expires, the terminal device determines to deactivate the first measurement window. The terminal device switches from performing cell measurement by using the first measurement window to performing cell measurement in the measurement window-free manner.

According to the foregoing method, when determining that the inactive duration corresponding to the SCC expires, the network device and the terminal device may deactivate both the first measurement window and the SCC, so that the terminal device switches from performing cell measurement by using the first measurement window to performing cell measurement in the measurement window-free manner.

Figure 11:
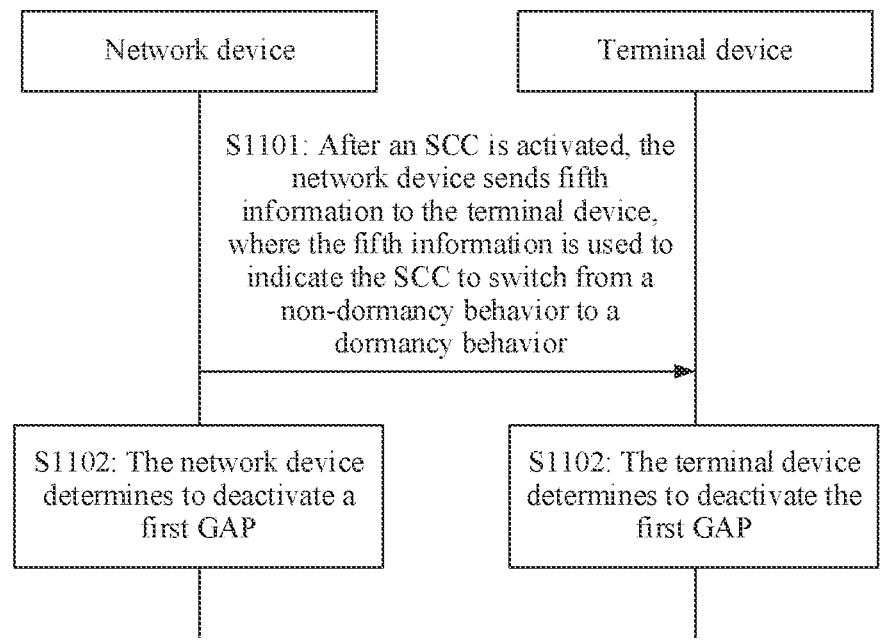
FIG. 11 is an overview flowchart 2 of a method for deactivating a measurement window according to an embodiment of this application.

This application further provides a method for deactivating a measurement window, so that when an SCC is unavailable, a terminal device switches from a measurement window measurement manner to a measurement window-free measurement manner. As shown in FIG. 11, the method includes the following steps.

S1101: After the SCC is activated, a network device sends fifth information to the terminal device, where the fifth information is used to indicate the SCC to switch from a non-dormancy behavior to a dormancy behavior.

S1102: The network device determines to deactivate a first measurement window.

Correspondingly, after determining that the SCC is activated, when receiving the fifth information from the network device, the terminal device determines to deactivate the first measurement window. The terminal device switches from performing cell measurement by using the first measurement window to performing cell measurement in the measurement window-free manner.

In a possible design, the network device sends sixth information to the terminal device. The sixth information is used to indicate the SCC to switch from the dormancy behavior to the non-dormancy behavior. The network device determines to activate the first measurement window.

Correspondingly, when the terminal device receives the sixth information from the network device, the terminal device determines to activate the first measurement window. The terminal device switches from performing cell measurement in the measurement window-free manner to performing cell measurement by using the first measurement window.

According to the foregoing method, the network device and the terminal device may determine to deactivate the first measurement window based on the switching of the SCC from the dormancy behavior to the non-dormancy behavior, and determine to reactivate the first measurement window based on the switching of the SCC from the non-dormancy behavior to the dormancy behavior, so that the terminal device can perform switching of measurement manners in time based on a fact that the SCC is currently in the dormancy behavior or the non-dormancy behavior.

In addition, in a possible design, after the SCC is activated, the terminal device may not transmit data through CA, and the terminal device continues to perform cell measurement in the measurement window-free measurement manner. Therefore, by using the foregoing design, the terminal device may actively roll back the SCC.

Embodiment 1: A measurement configuration method is provided. The method includes: A network device sends first information to a terminal device. The first information includes configuration information of an SCC. The network device sends second information to the terminal device. The second information includes configuration information of a first measurement window, and the second information is used to enable the terminal device to switch, when supporting CA, from performing cell measurement in a measurement window-free measurement manner to performing cell measurement by using the first measurement window. A carrier included in the CA includes the SCC.

Embodiment 2: According to the method in Embodiment 1, the method further includes: Before the network device sends the second information to the terminal device, the network device sends third information to the terminal device. The third information is used to activate the SCC.

Embodiment 3: According to the method in Embodiment 1, the method further includes: After the network device sends the second information to the terminal device, the network device sends third information to the terminal device. The third information is used to activate the SCC. The network device determines to activate the first measurement window.

Embodiment 4: According to the method in Embodiment 1, the method further includes: After the network device sends the first information to the terminal device, the network device starts a first timer. When first preset duration of the first timer expires, the network device determines to activate the first measurement window.

Embodiment 5: According to the method in any one of Embodiments 1 to 4, the method further includes: Before the network device sends the second information to the terminal device, the network device receives fourth information from the terminal device. The fourth information is used to request the network device to configure the first measurement window for the terminal device.

Embodiment 6: According to the method in any one of Embodiments 1 to 5, the method further includes: After the SCC is activated, the network device starts a second timer. When second preset duration of the second timer expires, the network device determines to deactivate the first measurement window. The second preset duration is inactive duration corresponding to the SCC.

Embodiment 7: According to the method in any one of Embodiments 1 to 6, the method further includes: The network device sends fifth information to the terminal device. The fifth information is used to indicate the SCC to switch from a non-dormancy behavior to a dormancy behavior. The network device determines to deactivate the first measurement window.

Embodiment 8: According to the method in Embodiment 7, the method further includes: The network device sends sixth information to the terminal device. The sixth information is used to indicate the SCC to switch from the dormancy behavior to the non-dormancy behavior. The network device determines to activate the first measurement window.

Embodiment 9: A measurement configuration method is provided. The method includes: A terminal device receives first information from a network device. The first information includes configuration information of an SCC. The terminal device receives second information from the network device. The second information includes configuration information of a first measurement window, and the second information is used to enable the terminal device to switch, when supporting CA, from performing cell measurement in a measurement window-free measurement manner to performing cell measurement by using the first measurement window. A carrier included in the CA includes the SCC.

Embodiment 10: According to the method in Embodiment 9, the method further includes: Before the terminal device receives the second information from the network device, the terminal device receives third information from the network device. The third information is used to activate the SCC.

Embodiment 11: According to the method in Embodiment 9, the method further includes: After the terminal device receives the second information from the network device, the terminal device receives third information from the network device. The third information is used to activate the SCC. The terminal device determines to activate the first measurement window.

Embodiment 12: According to the method in Embodiment 9, the method further includes: After the terminal device receives the first information from the network device, the terminal device starts a first timer. When first preset duration of the first timer expires, the terminal device determines to activate the first measurement window.

Embodiment 13: According to the method in any one of Embodiments 9 to 12, the method further includes: Before the terminal device receives the second information from the network device, the terminal device sends fourth information to the network device. The fourth information is used to request the network device to configure the first measurement window for the terminal device.

Embodiment 14: According to the method in any one of Embodiments 9 to 13, the method further includes: After the SCC is activated, the terminal device starts a second timer. When second preset duration of the second timer expires, the terminal device determines to deactivate the first measurement window. The second preset duration is inactive duration corresponding to the SCC.

According to the foregoing method, when determining that the inactive duration corresponding to the SCC expires, the terminal device may deactivate both the first measurement window and the SCC, so that the terminal device switches from performing cell measurement by using the first measurement window to performing cell measurement in the measurement window-free manner.

Embodiment 15: According to the method in any one of Embodiments 9 to 14, the method further includes: The terminal device receives fifth information from the network device. The fifth information is used to indicate the SCC to switch from a non-dormancy behavior to a dormancy behavior. The terminal device determines to deactivate the first measurement window.

Embodiment 16: According to the method in Embodiment 15, the method further includes: The terminal device receives sixth information from the network device. The sixth information is used to indicate the SCC to switch from the dormancy behavior to the non-dormancy behavior. The terminal device determines to activate the first measurement window.

Embodiment 17: According to the method in any one of Embodiments 9 to 16, the method further includes: After the SCC is activated, the terminal device skips transmitting data through the CA, and the terminal device performs cell measurement in the measurement window-free measurement manner.

Embodiment 18: A measurement configuration apparatus is provided. The apparatus includes a transceiver unit and a processing unit, and the processing unit invokes the transceiver unit to:
send first information to a terminal device, where the first information includes configuration information of an SCC; and send second information to the terminal device, where the second information includes configuration information of a first measurement window, and the second information is used to enable the terminal device to switch, when supporting CA, from performing cell measurement in a measurement window-free measurement manner to performing cell measurement by using the first measurement window, where a carrier included in the CA includes the SCC.

Embodiment 19: According to the apparatus in Embodiment 18, the transceiver unit is configured to: before sending the second information to the terminal device, send third information to the terminal device. The third information is used to activate the SCC.

Embodiment 20: According to the apparatus in Embodiment 18, the transceiver unit is configured to: after sending the second information to the terminal device, send third information to the terminal device. The third information is used to activate the SCC.

The processing unit is configured to determine to activate the first measurement window.

Embodiment 21: According to the apparatus in Embodiment 18, the processing unit is configured to: after sending the first information to the terminal device, start a first timer; and when first preset duration of the first timer expires, determine to activate the first measurement window.

Embodiment 22: According to the apparatus in any one of Embodiments 18 to 21, the transceiver unit is configured to: before sending the second information to the terminal device, receive fourth information from the terminal device. The fourth information is used to request the apparatus to configure the first measurement window for the terminal device.

Embodiment 23: According to the apparatus in any one of Embodiments 18 to 22, the processing unit is configured to: after the SCC is activated, start a second timer; and when second preset duration of the second timer expires, determine to deactivate the first measurement window. The second preset duration is inactive duration corresponding to the SCC.

Embodiment 24: According to the apparatus in any one of Embodiments 18 to 22, the transceiver unit is configured to send fifth information to the terminal device. The fifth information is used to indicate the SCC to switch from a non-dormancy behavior to a dormancy behavior.

The processing unit is configured to determine to deactivate the first measurement window.

Embodiment 25: According to the apparatus in Embodiment 24, the transceiver unit is configured to send sixth information to the terminal device. The sixth information is used to indicate the SCC to switch from the dormancy behavior to the non-dormancy behavior.

The processing unit is configured to determine to activate the first measurement window.

Embodiment 26: A measurement configuration apparatus is provided. The apparatus includes a transceiver unit and a processing unit, and the processing unit invokes the transceiver unit to:
receive first information from a network device, where the first information includes configuration information of an SCC; and receive second information from the network device, where the second information includes configuration information of a first measurement window, and the second information is used to enable a terminal device to switch, when supporting CA, from performing cell measurement in a measurement window-free measurement manner to performing cell measurement by using the first measurement window, where a carrier included in the CA includes the SCC.

Embodiment 27: According to the apparatus in Embodiment 26, the transceiver unit is configured to: before receiving the second information from the network device, receive third information from the network device. The third information is used to activate the SCC.

Embodiment 28: According to the apparatus in Embodiment 26, the transceiver unit is configured to: after receiving the second information from the network device, receive third information from the network device. The third information is used to activate the SCC.

The processing unit is configured to determine to activate the first measurement window.

Embodiment 29: According to the apparatus in Embodiment 26, the processing unit is configured to: after receiving the first information from the network device, start a first timer, and when first preset duration of the first timer expires, determine to activate the first measurement window.

Embodiment 30: According to the apparatus in any one of Embodiments 26 to 29, the transceiver unit is configured to: before receiving the second information from the network device, send fourth information to the network device. The fourth information is used to request the network device to configure the first measurement window for the terminal device.

Embodiment 31: According to the apparatus in any one of Embodiments 26 to 30, the processing unit is configured to: after the SCC is activated, start a second timer; and when second preset duration of the second timer expires, determine to deactivate the first measurement window. The second preset duration is inactive duration corresponding to the SCC.

Embodiment 32: According to the apparatus in any one of Embodiments 26 to 31, the transceiver unit is configured to receive fifth information from the network device. The fifth information is used to indicate the SCC to switch from a non-dormancy behavior to a dormancy behavior.

The processing unit is configured to determine to deactivate the first measurement window.

Embodiment 33: According to the apparatus in Embodiment 32, the transceiver unit is configured to receive sixth information from the network device. The sixth information is used to indicate the SCC to switch from the dormancy behavior to the non-dormancy behavior.

The processing unit is configured to determine to activate the first measurement window.

Embodiment 34: According to the apparatus in any one of Embodiments 26 to 31, the processing unit is configured to: after the SCC is activated, skip transmitting data through the CA, and perform cell measurement in the measurement window-free measurement manner.

Embodiment 35: A device is provided. The device includes a transceiver, a processor, and a memory, the memory stores program instructions, and when the program instructions are executed, the device is enabled to perform the method according to any one of Embodiments 1 to 17.

Embodiment 36: A chip is provided. The chip is coupled to a memory in an electronic device, so that the chip invokes, during running, program instructions stored in the memory, to implement the method according to any one of Embodiments 1 to 17.

Embodiment 37: A computer-readable storage medium is provided. The computer-readable storage medium includes program instructions, and when the program instructions are run on a device, the device is enabled to perform the method according to any one of Embodiments 1 to 17.

In the foregoing embodiments provided in this application, various solutions of the communication method provided in embodiments of this application are separately described from perspectives of each network element and interaction between network elements. It may be understood that, to implement the foregoing functions, the network elements, such as the network device and the terminal device, include a corresponding hardware structure and/or software module that is used to perform each function. Persons skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

Figure 12:
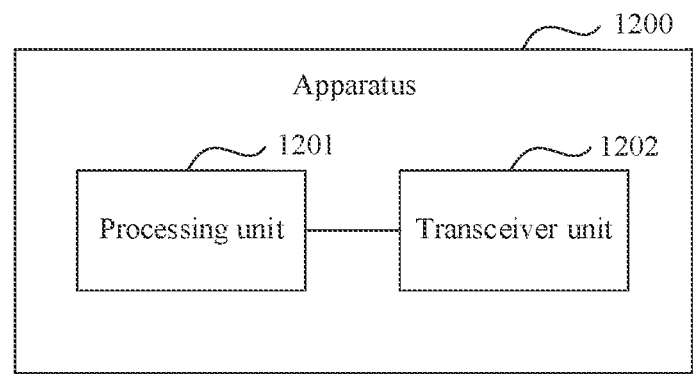
FIG. 12 is a schematic diagram 1 of a structure of an apparatus according to an embodiment of this application.

Same as the foregoing idea, as shown in FIG. 12, an embodiment of this application further provides an apparatus 1200. The apparatus 1200 includes a transceiver unit 1202 and a processing unit 1201.

In an example, the apparatus 1200 is configured to implement functions of the network device in the foregoing methods. The apparatus may be a network device.

The processing unit 1201 invokes the transceiver unit 1202 to:

send first information to a terminal device, where the first information includes configuration information of an SCC; and send second information to the terminal device, where the second information includes configuration information of a first measurement window, and the second information is used to enable the terminal device to switch, when supporting CA, from performing cell measurement in a measurement window-free measurement manner to performing cell measurement by using the first measurement window, where a carrier included in the CA includes the SCC.

In an example, the apparatus 1200 is configured to implement functions of the network device in the foregoing methods. The apparatus may be a terminal device, or may be an apparatus in the terminal device, such as a chip system.

The processing unit 1201 invokes the transceiver unit 1202 to:

receive the first information from the network device, where the first information includes the configuration information of the SCC; and receive the second information from the network device, where the second information includes the configuration information of the first measurement window, and the second information is used to enable the terminal device to switch, when supporting the CA, from performing cell measurement in the measurement window-free measurement manner to performing cell measurement by using the first measurement window, where the carrier included in the CA includes the SCC.

For specific execution processes of the processing unit 1201 and the transceiver unit 1202, refer to the descriptions in the foregoing method embodiments. Division into modules in embodiments of this application is an example, is merely logical function division, and may be other division during actual implementation. In addition, function modules in embodiments of this application may be integrated into one processor, or each of the modules may exist alone physically, or two or more modules may be integrated into one module. The integrated module may be implemented in a form of hardware, or may be implemented in a form of a software function module.

As another optional variation, the apparatus may be a chip system. In this embodiment of this application, the chip system may include a chip, or may include a chip and another discrete component. For example, the apparatus includes a processor and an interface circuit. The interface circuit is configured to receive code instructions and transmit the code instructions to the processor. The processor runs the code instructions, to perform the method according to any one of the foregoing embodiments. The processor implements functions of the processing unit 1201, and the interface circuit implements functions of the transceiver unit 1202.

Figure 13:
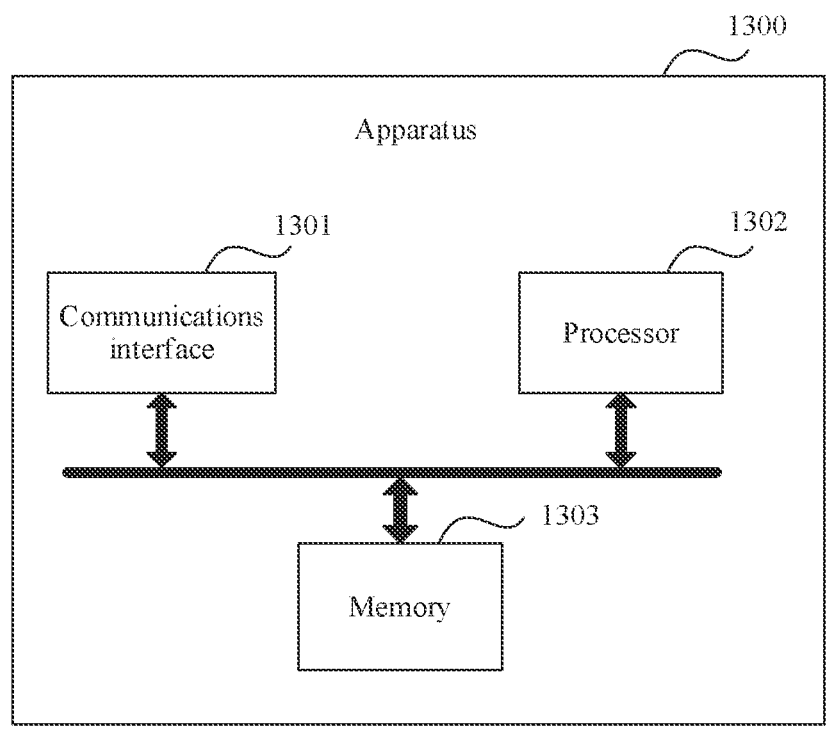
FIG. 13 is a schematic diagram 2 of a structure of an apparatus according to an embodiment of this application.

Same as the foregoing idea, as shown in FIG. 13, an embodiment of this application further provides an apparatus 1300. The apparatus 1300 includes a communications interface 1301, at least one processor 1302, and at least one memory 1303. The communications interface 1301 is configured to communicate with another device by using a transmission medium, so that an apparatus in the apparatus 1300 can communicate with the another device. The memory 1303 is configured to store a computer program. The processor 1302 invokes the computer program stored in the memory 1303, to send and receive data through the communications interface 1301, to perform the method according to any one of the foregoing embodiments.

For example, when the apparatus is a terminal device, the memory 1303 is configured to store a computer program, and the processor 1302 invokes the computer program stored in the memory 1303 to perform, through the communications interface 1301, the method performed by the terminal device according to any one of the foregoing embodiments.

In this embodiment of this application, the communications interface 1301 may be a transceiver, a circuit, a bus, a module, or a communications interface of another type. The processor 1302 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general purpose processor may be a microprocessor or any conventional processor or the like. The steps of the method disclosed with reference to embodiments of this application may be directly performed and completed by a hardware processor, or may be performed and completed by using a combination of hardware and software modules in the processor. The memory 1303 may be a nonvolatile memory, for example, a hard disk drive (hard disk drive, HDD) or a solid-state drive (solid-state drive, SSD), or may be a volatile memory (volatile memory), for example, a random access memory (random access memory, RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function. The memory 1303 is coupled to the processor 1302. Couplings in this embodiment of this application are indirect couplings or communication connections between apparatuses, units, or modules, may be implemented in electronic, mechanical, or other forms, and are used for information exchange between the apparatuses, the units, or the modules. In another implementation, the memory 1303 may alternatively be located outside the apparatus 1300. The processor 1302 may cooperate with the memory 1303. The processor 1302 may execute program instructions stored in the memory 1303. At least one of the at least one memory 1303 may alternatively be included in the processor 1302. A connection medium between the foregoing communications interface 1301, processor 1302, and memory 1303 is not limited in this embodiment of this application. For example, in this embodiment of this application, the memory 1303, the processor 1302, and the communications interface 1301 may be connected through a bus in FIG. 13. The bus may be classified into an address bus, a data bus, a control bus, and the like.

It may be understood that the apparatus in the embodiment shown in FIG. 12 may be implemented by the apparatus 1300 shown in FIG. 13. Specifically, the processing unit 1201 may be implemented by the processor 1302, and the transceiver unit 1202 may be implemented by the communications interface 1301.

An embodiment of this application further provides a computer-readable storage medium. The computer-readable storage medium stores a computer program. When the computer program runs on a computer, the computer is enabled to perform the method according to any one of the foregoing embodiments.

All or some of the methods in embodiments of this application may be implemented by software, hardware, firmware, or any combination thereof. When the software is used to implement embodiments, all or some of the embodiments may be implemented in a form of a computer program product. The computer program product includes one or more computer instructions. When the computer program instructions are loaded and executed on the computer, the procedures or functions according to embodiments of the present invention are all or partially generated. The computer may be a general-purpose computer, a special-purpose computer, a computer network, a network device, user equipment, or another programmable apparatus. The computer instructions may be stored in the computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, a solid state disk (Solid State Disk, SSD)), or the like.

The foregoing embodiments are merely used to describe the technical solutions of this application in detail. The descriptions of the foregoing embodiments are merely intended to help understand the method according to embodiments of the present invention, and shall not be construed as any limitation on embodiments of the present invention. Variations or replacements readily figured out by persons skilled in the art shall fall within the protection scope of embodiments of the present invention.

What is claimed is:

1. A measurement configuration method implemented by an apparatus, wherein the measurement configuration method comprises:
sending, to a terminal device, first information comprising first configuration information of a secondary component carrier (SCC);
sending, to the terminal device, second information comprising second configuration information of a measurement window;
sending, to the terminal device, third information for activating the SCC; and
activating, in response to sending the third information, the measurement window.

2. The measurement configuration method of claim 1, wherein the second information enables the terminal device to switch from performing first cell measurement in a measurement window-free measurement manner to performing second cell measurement using the measurement window when supporting carrier aggregation (CA), and wherein a carrier comprised in the CA comprises the SCC.

3. The measurement configuration method of claim 1, further comprising further sending, to the terminal device after sending the second information to the terminal device, the third information.

4. The measurement configuration method of claim 1, further comprising:
starting, after the SCC has been activated, a timer; and
determining to deactivate the measurement window when a preset duration of the timer has expired, wherein the preset duration is an inactive duration corresponding to the SCC.

5. A measurement configuration method implemented by an apparatus, wherein the measurement configuration method comprises:
receiving, from a network device, first information comprising first configuration information of a secondary component carrier (SCC);
receiving, from the network device, second information comprising second configuration information of a measurement window;
receiving, from the network device, third information for activating the SCC; and
activating, in response to receiving the third information, the measurement window.

6. The measurement configuration method of claim 5, wherein the second information enables the apparatus to switch from performing first cell measurement in a measurement window-free measurement manner to performing second cell measurement using the measurement window when supporting carrier aggregation (CA), and wherein a carrier comprised in the CA comprises the SCC.

7. The measurement configuration method of claim 5, further comprising further receiving, from the network device after receiving the second information from the network device, the third information.

8. The measurement configuration method of claim 5, further comprising:
activating the SCC;
starting, in response to activating the SCC, a timer; and
determining to deactivate the measurement window when a preset duration of the timer has expired, wherein the preset duration is an inactive duration corresponding to the SCC.

9. The measurement configuration method of claim 5, further comprising:
receiving, from the network device, fourth information instructing the SCC to switch from a non-dormancy behavior to a dormancy behavior; and
determining to deactivate the measurement window.

10. The measurement configuration method of claim 9, further comprising:
receiving, from the network device, fifth information instructing the SCC to switch from the dormancy behavior to the non-dormancy behavior; and
determining to activate the measurement window.

11. The measurement configuration method of claim 5, wherein after activating the SCC, the measurement configuration method further comprises:
skipping transmitting data through carrier aggregation (CA); and
performing cell measurement in a measurement window-free measurement manner.

12. An apparatus comprising:
a non-transitory memory configured to store program instructions; and
a processor coupled to the non-transitory memory and configured to execute the program instructions to cause the apparatus to:
receive, from a network device, first information comprising first configuration information of a secondary component carrier (SCC);
receive, from the network device, second information comprising second configuration information of a measurement window;
receive, from the network device, third information for activating the SCC; and
activate, in response to receiving the third information, the measurement window.

13. The apparatus of claim 12, wherein the second information enables the apparatus to switch from performing first cell measurement in a measurement window-free measurement manner to performing second cell measurement using the measurement window when supporting carrier aggregation (CA), and wherein a carrier comprised in the CA comprises the SCC.

14. The apparatus of claim 12, wherein the processor is further configured to execute the program instructions to cause the apparatus to further receive, from the network device after receiving the second information from the network device, the third information.

15. The apparatus of claim 12, wherein the processor is further configured to execute the program instructions to cause the apparatus to:
activate the SCC;
start, in response to activating the SCC, a timer; and
determine to deactivate the measurement window when a preset duration of the timer has expired, wherein the preset duration is an inactive duration corresponding to the SCC.

16. The apparatus of claim 12, wherein the processor is further configured to execute the program instructions to cause the apparatus to:

receive, from the network device, fourth information instructing the SCC to switch from a non-dormancy behavior to a dormancy behavior; and determine to deactivate the measurement window.

17. The apparatus of claim 16, wherein the processor is further configured to execute the program instructions to cause the apparatus to:

receive, from the network device, fifth information instructing the SCC to switch from the dormancy behavior to the non-dormancy behavior; and determine to activate the measurement window.

18. The apparatus of claim 12, wherein the processor is further configured to execute the program instructions to cause the apparatus to:

skip transmitting data through carrier aggregation (CA); and perform cell measurement in a measurement window-free measurement manner.

19. The apparatus of claim 12, wherein the processor is further configured to execute the program instructions to cause the apparatus to:

start a timer after receiving the first information; and determine to activate the measurement window when a preset duration of the timer has expired.

20. The apparatus of claim 12, wherein before receiving the second information, the processor is further configured to execute the program instructions to cause the apparatus to send, to the network device, fourth information requesting the network device to configure the measurement window for the apparatus.

* * * * *